United States Patent
Nonogaki et al.

(10) Patent No.: US 9,969,139 B2
(45) Date of Patent: May 15, 2018

(54) BLADDER-FIXING UNIT (71) Applicant: TOYO TIRE & RUBBER CO., LTD., Osaka-shi, Osaka (JP)

(72) Inventors: Yuta Nonogaki, Osaka (JP); Taizo Yamamoto, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 38 days.

(21) Appl. No.: 15/291,651

(22) Filed: Oct. 12, 2016

(65) Prior Publication Data
US 2017/0106611 A1  Apr. 20, 2017

(30) Foreign Application Priority Data
Oct. 15, 2015 (JP) ................................. 2015-203758

(51) Int. Cl.
*B29D 30/06* (2006.01)

(52) U.S. Cl.
CPC .. *B29D 30/0645* (2013.01); *B29D 2030/0646* (2013.01)

(58) Field of Classification Search
CPC ............ B29D 30/0645; B29D 30/0649; B29D 2030/0646
See application file for complete search history.

(56) References Cited

U.S. PATENT DOCUMENTS

| 4,872,822 | A | * | 10/1989 | Pizzorno | B29D 30/06 264/315 |
| 5,393,480 | A | * | 2/1995 | Pizzorno | B29D 30/0645 264/315 |
| 5,409,361 | A | * | 4/1995 | Ichikawa | B29D 30/0645 425/43 |
| 5,522,716 | A | * | 6/1996 | Ureshino | B29C 33/304 425/48 |
| 5,853,526 | A | * | 12/1998 | Laurent | B29C 43/3642 156/396 |
| 7,740,462 | B2 | * | 6/2010 | Ichimaru | B29D 30/0603 425/31 |
| 8,133,046 | B2 | * | 3/2012 | Tomoto | B29C 33/304 425/48 |
| 2009/0263524 | A1 | | 10/2009 | Ichimaru | |

FOREIGN PATENT DOCUMENTS

JP  2007-98803 A  4/2007

* cited by examiner

*Primary Examiner* — James P Mackey
(74) *Attorney, Agent, or Firm* — Westerman, Hattori, Daniels & Adrian, LLP (57) ABSTRACT

A bladder-fixing unit fixes a bladder which expands in a tire to hold the tire,
the bladder-fixing unit includes a shaft body inserted into the bladder, and a connecting body for fixing the bladder and for connecting the bladder and the shaft body to each other,
the connecting body includes a switching mechanism for switching between a state where the connecting body pressurizes and comes into contact with an outer periphery of the shaft body and is fixed to the shaft body, and a movable state where the connecting body can move in an axial direction of the shaft body relative to the shaft body by releasing the state where the connecting body pressurizes and comes into contact with the outer periphery of the shaft body.

6 Claims, 10 Drawing Sheets

BLADDER-FIXING UNIT

CROSS REFERENCE TO RELATED APPLICATIONS

This application claims the benefit of priority of Japanese application no. 2015-203758, filed on Oct. 15, 2015, which is incorporated herein by reference.

BACKGROUND OF THE INVENTION

Field of the Invention

The present invention relates to a bladder-fixing unit for fixing a bladder which expands in a tire to hold the tire.

Description of the Related Art

Conventionally, a bladder which expands in a tire to hold the tire is fixed to a bladder-fixing unit (e.g., JP-A-2007-98803). The bladder-fixing unit is an exclusive unit only for a tire having a predetermined size, and one bladder-fixing unit cannot handle tires of a plurality of sizes.

SUMMARY OF THE INVENTION

Hence, in view of the above circumstances, it is an object of the present invention to provide a bladder-fixing unit capable of handling tires of a plurality of sizes.

There is provided a bladder-fixing unit for fixing a bladder which expands in a tire to hold the tire, the bladder-fixing unit includes a shaft body inserted into the bladder, and a connecting body for fixing the bladder and for connecting the bladder and the shaft body to each other, the connecting body includes a switching mechanism for switching between a state where the connecting body pressurizes and comes into contact with an outer periphery of the shaft body and is fixed to the shaft body, and a movable state where the connecting body can move in an axial direction of the shaft body relative to the shaft body by releasing the state where the connecting body pressurizes and comes into contact with the outer periphery of the shaft body.

Also, the bladder-fixing unit may have a configuration in which:

the switching mechanism includes a cylindrical inner cylindrical body into which the shaft body is inserted, and a cylindrical outer cylindrical body, if the outer cylindrical body moves toward the one side in the axial direction relative to the inner cylindrical body, an inner periphery of the outer cylindrical body comes into contact with an outer periphery of the inner cylindrical body, the inner cylindrical body includes a contact portion which pressurizes and comes into contact with the outer periphery of the shaft body, and an elastic portion, and if the outer periphery of the inner cylindrical body comes into contact with the inner periphery of the outer cylindrical body, the elastic portion elastically deforms such that the contact portion approaches, pressurizes and comes into contact with the outer periphery of the shaft body.

Also, the bladder-fixing unit may have a configuration in which:

the outer cylindrical body fixes the bladder, and a diameter of the outer periphery of the inner cylindrical body and a diameter of the inner periphery of the culver cylindrical body increase toward the one side in the axial direction such that as the bladder expands, the outer cylindrical body moves toward the one side in the axial direction relative to the inner cylindrical body, and the elastic portion elastically deforms.

Also, the bladder-fixing unit may have a configuration in which:

the switching mechanism includes a biasing body which biases the outer cylindrical body in a direction in which the outer cylindrical body moves toward the one side in the axial direction relative to the inner cylindrical body when the connecting body is in the state where it is fixed to the shaft body.

Also, the bladder-fixing unit may have a configuration in which:

even when the connecting body is in the movable state where the connecting body can move in the axial direction relative to the shaft body, the biasing body biases the outer cylindrical body in the direction where the outer cylindrical body moves toward the one side in the axial direction relative to the inner cylindrical body.

Also, the bladder-fixing unit may have a configuration in which:

only the contact portion of the inner cylindrical body is made of material which is different from those of other portions, and the contact portion is made of material having a larger friction coefficient with respect to the shaft body than those of the other portions.

The described bladder-fixing unit exerts an excellent effect that it is possible to handle tires of a plurality of sizes.

DETAILED DESCRIPTION OF THE PREFERRED EMBODIMENTS

An embodiment of a bladder-fixing unit will be described with reference to FIGS. 1 to 9. In the drawings (FIGS. 10 to 13 are also the same), sizes of the drawings do not absolutely match with actual sizes.

Figure 1:
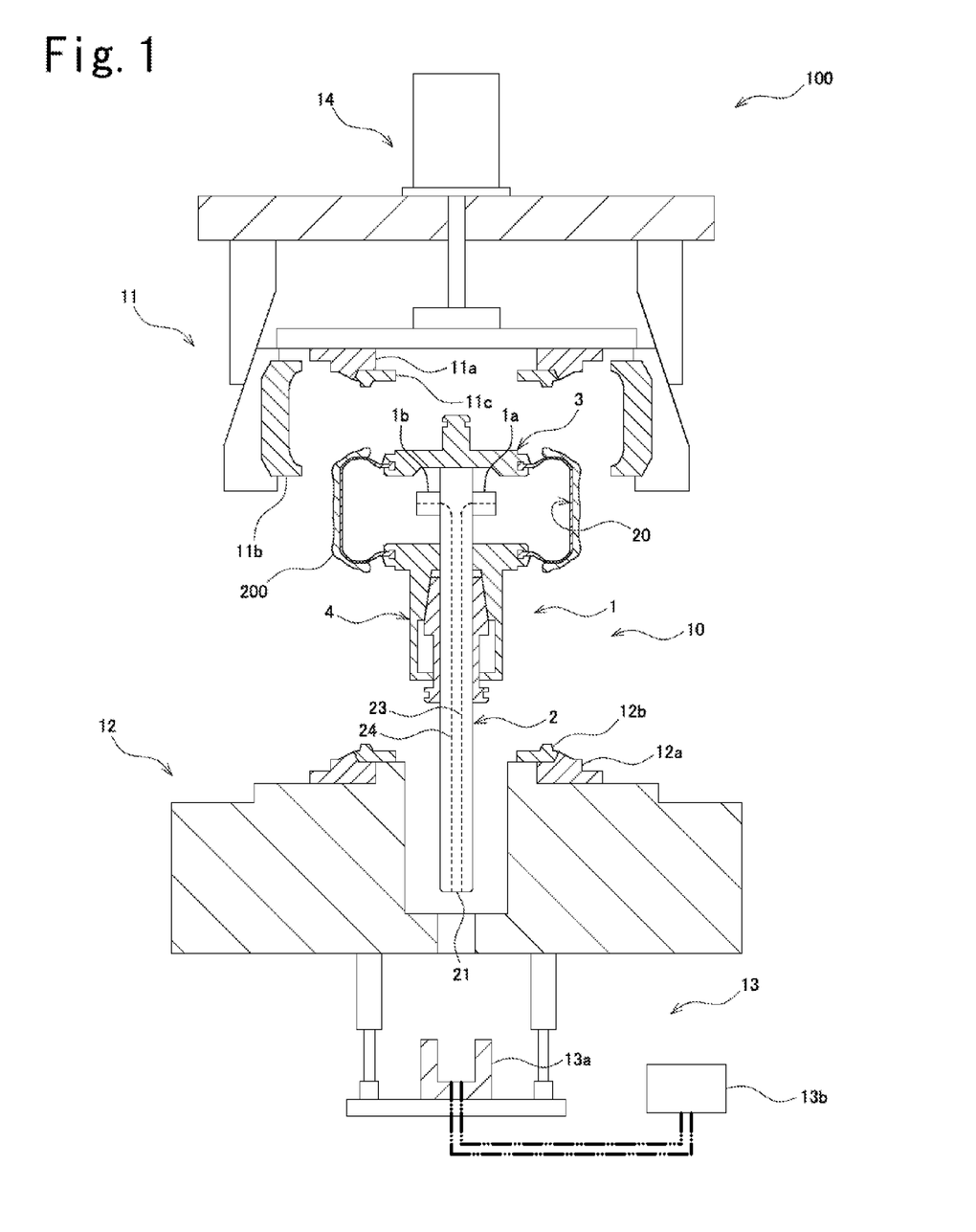
FIG. 1 is a schematic sectional view of an entire tire-vulcanizing device having a bladder-fixing unit according to an embodiment.

As shown in FIG. 1, a tire-vulcanizing device 100 according to the embodiment includes an upper container 11 placed at an upper location, a lower container 12 placed at a lower location, and a tire-holding unit 10 for holding a tire 200. The tire-vulcanizing device 100 also includes a fluid device 13 for making fluid flow into and out from the tire-holding unit 10, and a drive device 14 for driving the upper container 11.

The upper container 11 includes a side mold 11a which forms a sidewall portion of the tire 200, a plurality of tread molds 11b which form a tread portion of the tire 200, and a bead ring 11c into which a bead portion of the tire 200 is fitted. The lower container 12 includes a side mold 12a which forms a sidewall portion of the tire 200, and a bead ring 12b into which a bead portion of the tire 200 is fitted.

The tire-holding unit 10 includes a bladder 20 which expands in the tire 200 to hold the tire 200, and bladder-fixing unit 1 for fixing the bladder 20. The tire-holding unit 10 can be attached to and detached from the lower container 12.

The bladder-fixing unit 1 includes a shaft body 2 which is inserted into the bladder 20, a fixing body 3 for fixing the bladder 20 and the shaft body 2 to each other, and a connecting body 4 for connecting the bladder 20 and the shaft body 2 to each other. The bladder-fixing unit 1 also includes an inflow portion 1a through which fluid flows into the bladder 20, and an outflow portion 1b through which fluid flows out from the bladder 20.

The inflow portion 1a and the outflow portion 1b are fixed to the shaft body 2, and placed between the fixing body 3 and the connecting body 4 so that the inflow portion 1a and the outflow portion 1b are placed in the bladder 20. The shaft body 2 includes an inflow path 23 which brings a first end 21 and the inflow portion 1a into communication with each other on one side (lower side in FIG. 1), and an outflow path 24 which brings the first end 21 and the outflow portion 1b into communication with each other so that fluid flows through the shaft body 2.

The fluid device 13 includes a shaft body-holding portion 13a which holds the first end 21 of the shaft body 2 when the tire-holding unit 10 is attached to the lower container 12. The fluid device 13 includes a fluid source 13b through which fluid flows into and out from the bladder 20 through the shaft body-holding portion 13a, the inflow path 23 (outflow path 24), and the inflow portion 1a (outflow portion 1b). The fluid is inert gas such as vapor, nitrogen and helium.

When the molds are to be opened, the drive device 14 separates the pair of side molds 11a and 12a from each other, and the drive device 14 moves the plurality of annularly arranged bread molds 11b outward so that the tread molds 11b radially spread. According to this, it is possible to bring the tire 200 in and out.

When the molds are to be closed, the drive device 14 moves the tread molds 11b inward and brings the side molds 11a and 12a close to each other so that the tread molds 11b gather and form a continuously connected annular shape. According to this, inner surfaces of the molds 11a, 11b and 12a can come into intimate contact with an outer surface of the tire 200.

Figure 2:
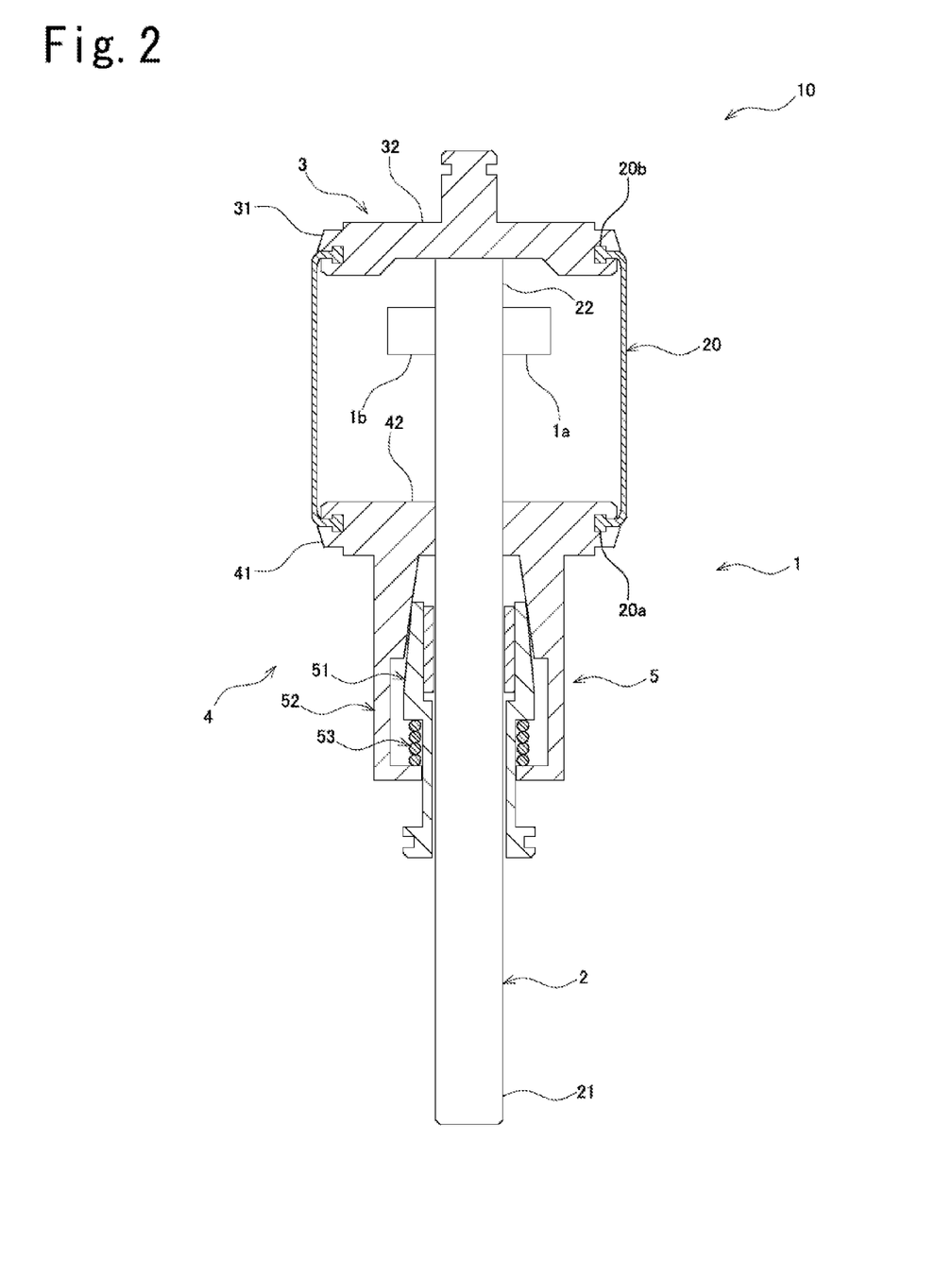
FIG. 2 is sectional view of the entire bladder-fixing unit according to the embodiment and shows its movable state.

As shown in FIG. 2, the bladder 20 is formed into a cylindrical shape, and includes a first opening 20a and a second opening 20b. In the embodiment, the bladder 20 is made of material having elasticity, e.g., rubber.

An outer shape of a cross section of the shaft body 2 which intersects with an axial direction of the shaft body 2 at the right angles is the same over the axial direction. In the embodiment, the shaft body 2 is formed into a cylindrical shape, and an outer shape of its cross section is a circular shape having the same diameter over its axial direction. In the embodiment, the shaft body 2 is made of rigid material, e.g., metal such as stainless steel.

The fixing body 3 includes a bladder-fixing portion 31 for fixing the second opening 20b of the bladder 20, and a closing portion 32 for closing the second opening 20b of the bladder 20 to restrain fluid from flowing out from the second opening 20b of the bladder 20. The closing portion 32 is formed into a disk shape, and the bladder-fixing portion 31 is connected to an outer periphery of the closing portion 32.

The closing portion 32 is immovably fixed to a second end 22 on the other side of the shaft body 2. According to this, the fixing body 3 is immovably fixed to the second end 22 on the other side of the shaft body 2, and the fixing body 3 fixes the bladder 20 and the shaft body 2 to each other. The second opening 20b of the bladder 20 can be attached to and detached from the bladder-fixing portion 31.

As shown in FIGS. 2 to 5, the connecting body 4 includes a bladder-fixing portion 41 for fixing the first opening 20a of the bladder 20, and a closing portion 42 for closing the first opening 20a of the bladder 20 to restrain fluid from flowing out from the first opening 20a of the bladder 20. The connecting body 4 includes a switching mechanism 5 which switches between a fixed state where the connecting body 4 is fixed to the shaft body 2 and a movable state where the connecting body 4 can move relative to the shaft body 2 in the axial direction.

The closing portion 42 is formed into an annular disk shape, and the bladder-fixing portion 41 is connected to an outer periphery of the closing portion 42. The shaft body 2 is inserted into a hole of the closing portion 42. The closing portion 42 is switched by the switching mechanism 5 between a fixed state where the closing portion 42 is fixed to the shaft body 2 and a movable state where the closing portion 42 can move relative to the shaft body 2 in the axial direction. The first opening 20a of the bladder 20 can be attached to and detached from the bladder-fixing portion 41.

The switching mechanism 5 includes a cylindrical inner cylindrical body 51 into which the shaft body 2 is inserted, a cylindrical outer cylindrical body 52 into which the inner cylindrical body 51 is inserted, and a biasing body 53 which biases the inner cylindrical body 51 and the outer cylindrical body 52. The outer cylindrical body 52 is fixed to the bladder 20. Specifically, the outer cylindrical body 52 is connected to the bladder-fixing portion 41 and the closing portion 42 on the other side (on the side of second end 22 of shaft body 2) in the axial direction.

As shown in FIGS. 2 to 7, the inner cylindrical body 51 is provided at its other side in the axial direction with an inner cylindrical taper portion 51a. A diameter of an outer periphery of the inner cylindrical taper portion 51a is increased toward one side (toward first end 21 of shaft body 2) in the axial direction. The inner cylindrical body 51 is provided at the one side in the axial direction with an exposed portion 51b which projects from the outer cylindrical body 52.

The outer cylindrical body 52 is provided at its other side in the axial direction with an outer cylindrical taper portion 52a. A diameter of an inner periphery of the outer cylindrical taper portion 52a is increased toward one side in the axial direction. The outer cylindrical body 52 is provided at its one side in the axial direction with a projecting portion 52b which projects inward in the radial direction.

The outer cylindrical taper portion 52a is superposed on the inner cylindrical taper portion 51a in the axial direction. Therefore, if the outer cylindrical body 52 moves toward one side in the axial direction relative to the inner cylindrical body 51, the inner periphery of the outer cylindrical taper portion 52a comes into contact with the outer periphery of the inner cylindrical taper portion 51a.

The inner cylindrical taper portion 51a includes an elastic portion 51c. When an outer periphery of the inner cylindrical taper portion 51a comes into contact with an inner periphery of the outer cylindrical taper portion the elastic portion 51c elastically deforms. More specifically, the inner cylindrical taper portion 51a includes a cylindrical base portion 51d, and a plurality of elastic pieces 51e which project from the base portion 51d toward the other side in the axial direction and which are arranged along the circumferential direction.

The inner cylindrical taper portion 51a is provided at its inner periphery with a contact portion 51f which pressurizes and comes into contact with an outer periphery of the shaft body 2. If the elastic portion 51c elastically deforms, the contact portion 51f approaches the outer periphery of the shaft body 2 and pressurizes and comes into contact with the outer periphery of the shaft body 2. In the embodiment, the inner cylindrical body 51 and the outer cylindrical body 52 are made of metal such as stainless steel, for example. Only the contact portion 51f of the inner cylindrical body 51 may be made of material which is different from those of other portions. For example, the contact portion 51f may be made of material having a higher friction coefficient than the shaft body 2.

In the embodiment, the biasing body 53 is a cylindrical coil spring. The inner cylindrical body 51 is inserted into the biasing body 53. The biasing body 53 is placed between the inner cylindrical taper portion 51a of the inner cylindrical body 51 and the projecting portion 52b of the outer cylindrical body 52. The biasing body 53 biases the inner cylindrical body 51 and the outer cylindrical body 52, thereby stabilizing them. According to this, the axial direction of the inner cylindrical body 51 and the axial direction of the outer cylindrical body 52 match with each other.

Figure 3:
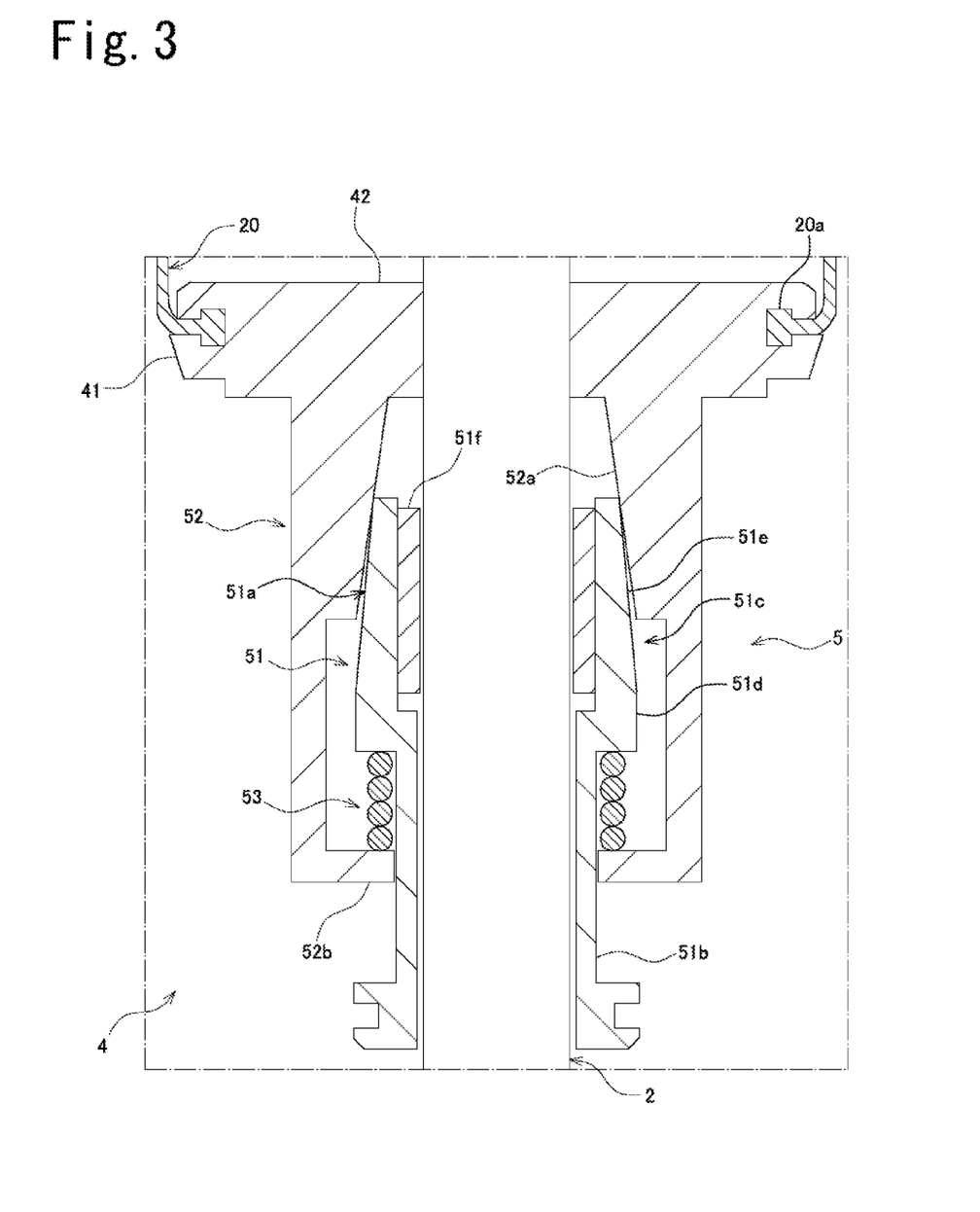
FIG. 3 is an enlarged view of essential portions of FIG. 2.
Figure 4:
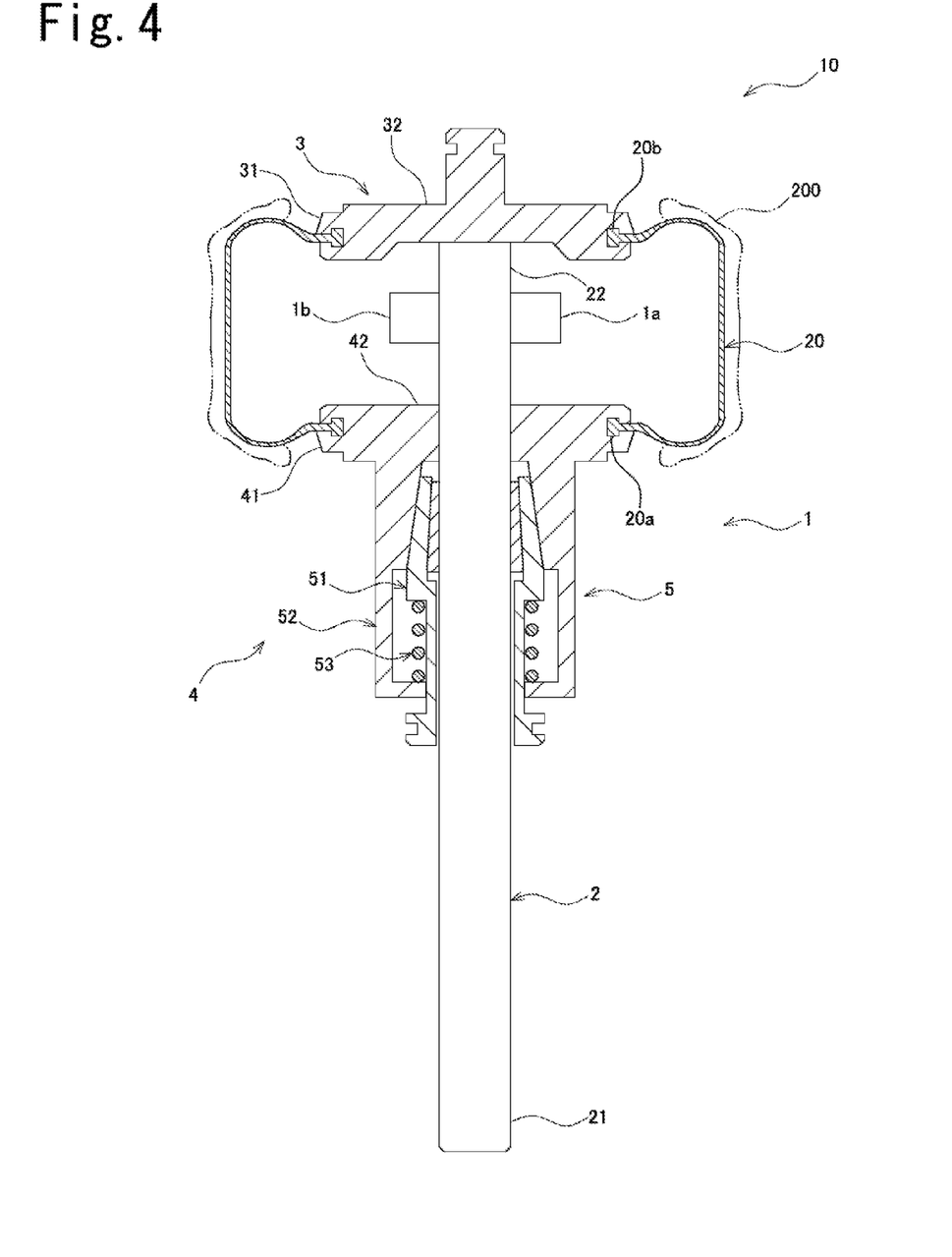
FIG. 4 is a sectional view of the entire bladder-fixing unit according to the embodiment and shows its fixed state.
Figure 5:
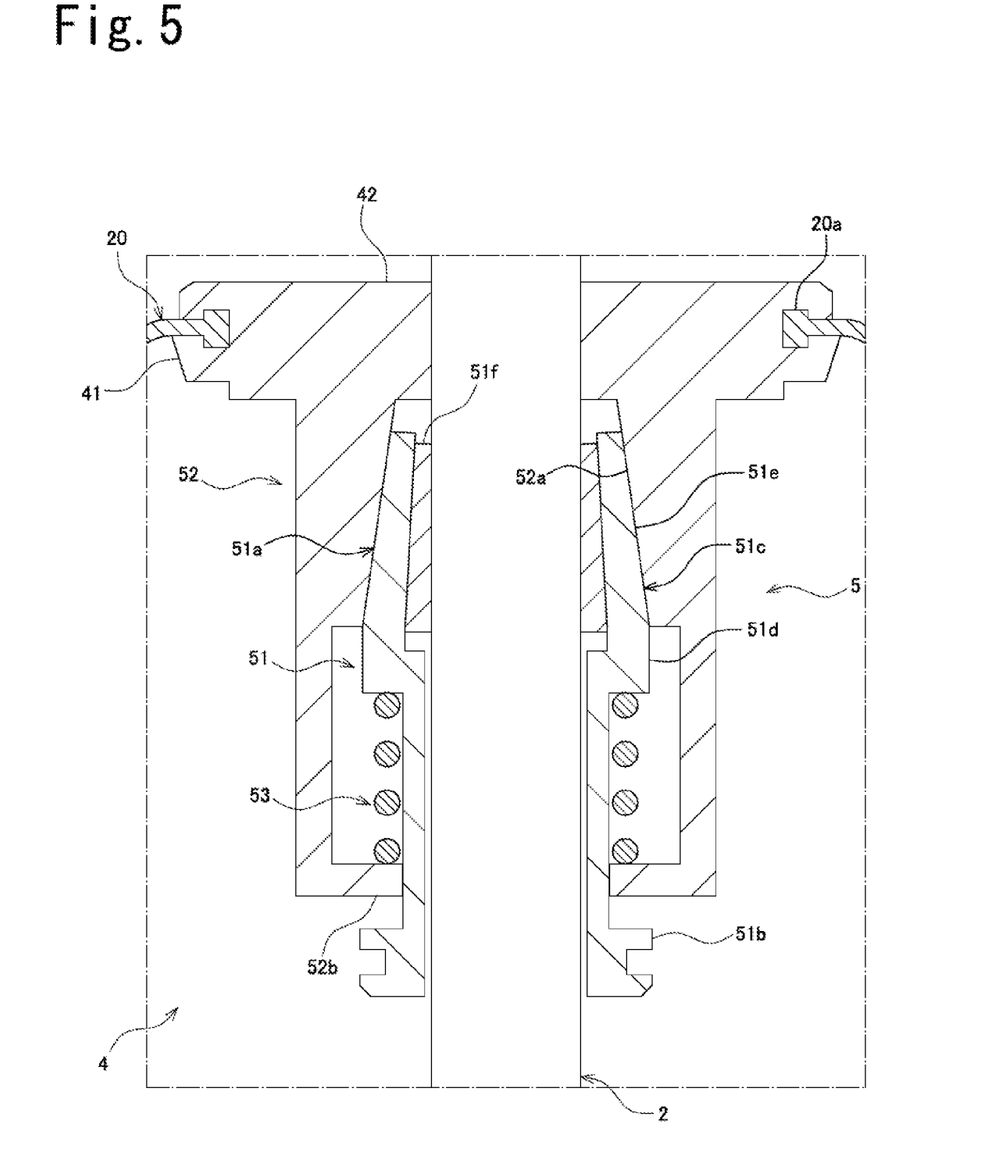
FIG. 5 is an enlarged view of essential portions of FIG. 4.
Figure 6:
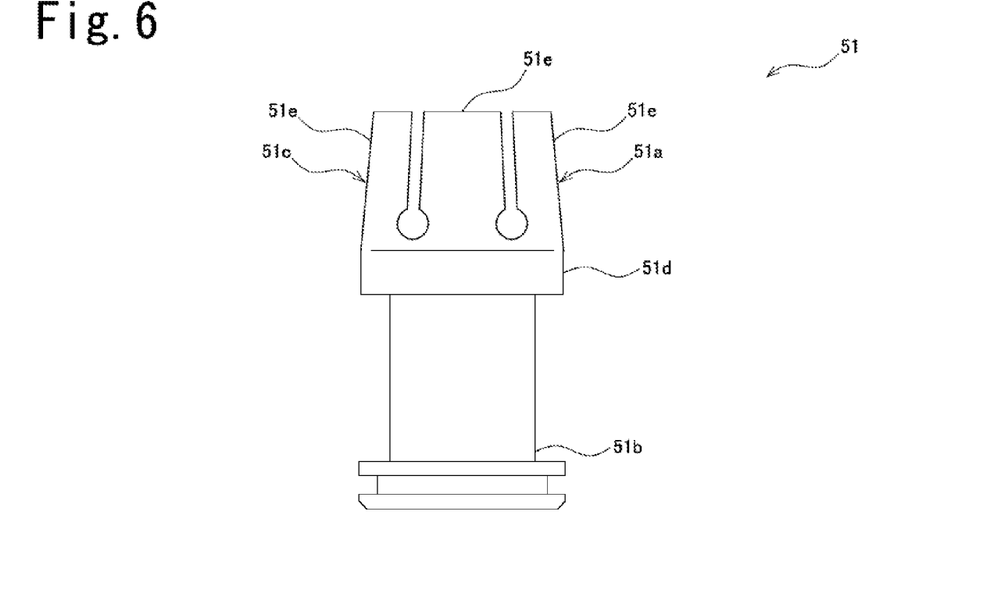
FIG. 6 is a front view of an entire inner cylindrical body according to the embodiment.
Figure 7:
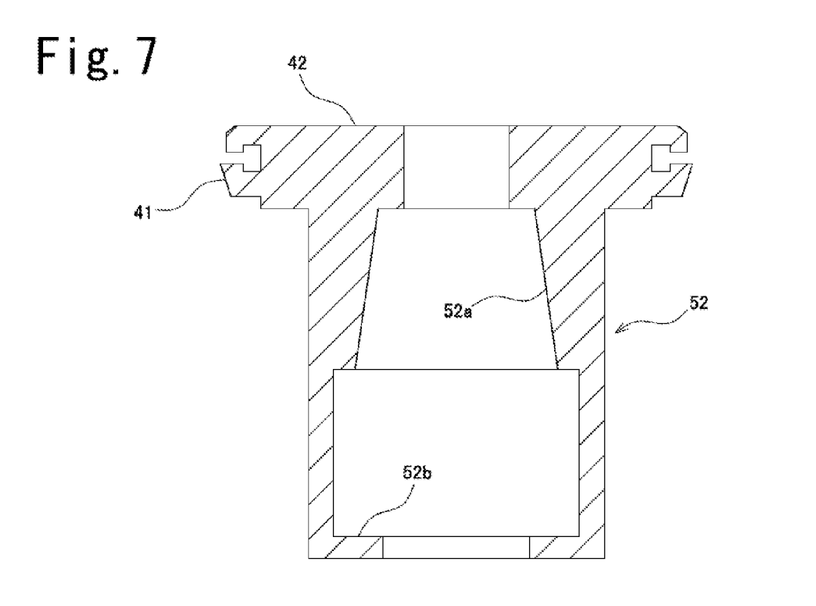
FIG. 7 is a sectional view of an entire assembly having an outer cylindrical body according to the embodiment.

As shown in FIGS. 2 and 3, when the connecting body 4 is in the movable state, the biasing body 53 elastically deforms such that it shrinks and by this restoring force, the biasing body 53 biases the outer cylindrical body 52 such that the outer cylindrical body 52 moves toward the one side in the axial direction relative to the inner cylindrical body 51. Further, as shown in FIGS. 4 and 5, also when the connecting body 4 is in the fixed state, the biasing body 53 elastically deforms such that it shrinks and by this restoring force, the biasing body 53 biases the outer cylindrical body 52 in such a direction that the outer cylindrical body 52 moves toward the one side in the axial direction relative to the inner cylindrical body 51.

The configuration of the bladder-fixing unit 1 according to the embodiment is as described above. Next, a switching method for switching between a movable state and a fixed state of the bladder-fixing unit 1 of the embodiment will be described with reference to FIGS. 8 and 9.

Figure 8:
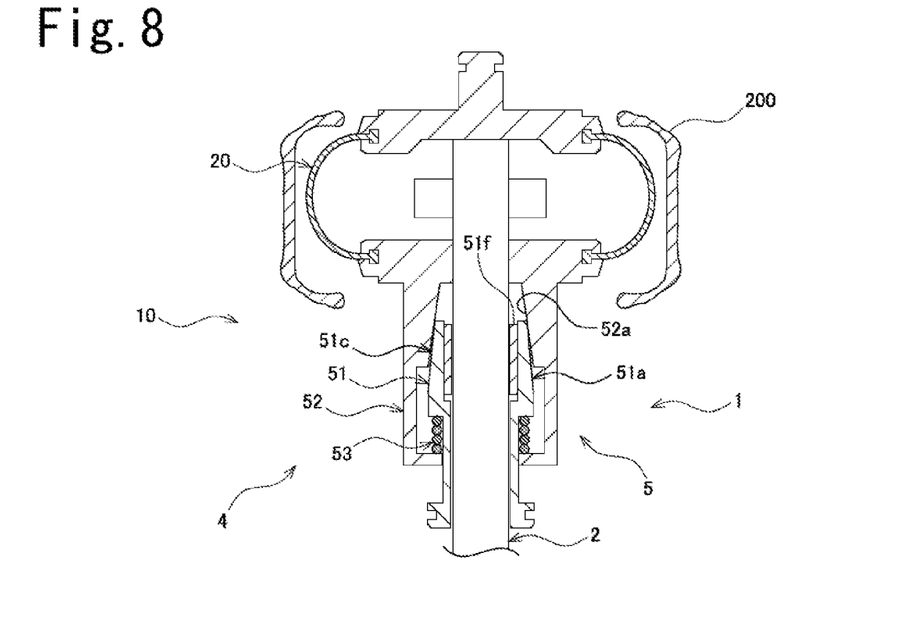
FIG. 8 is a sectional view of essential portions of the bladder-fixing unit according to the embodiment for explaining a switching operation of states.

As shown in FIG. 8, in the movable state where the elastic portion 51c of the inner cylindrical body 51 is restored (not elastically deformed), the connecting body 4 can move in the axial direction relative to the shaft body 2. Therefore, the connecting body 4 is placed at a predetermined position in accordance with the held tire 200. In a state where the inner cylindrical body 51 and the shaft body 2 are held, fluid flows into the bladder 20.

Figure 9:
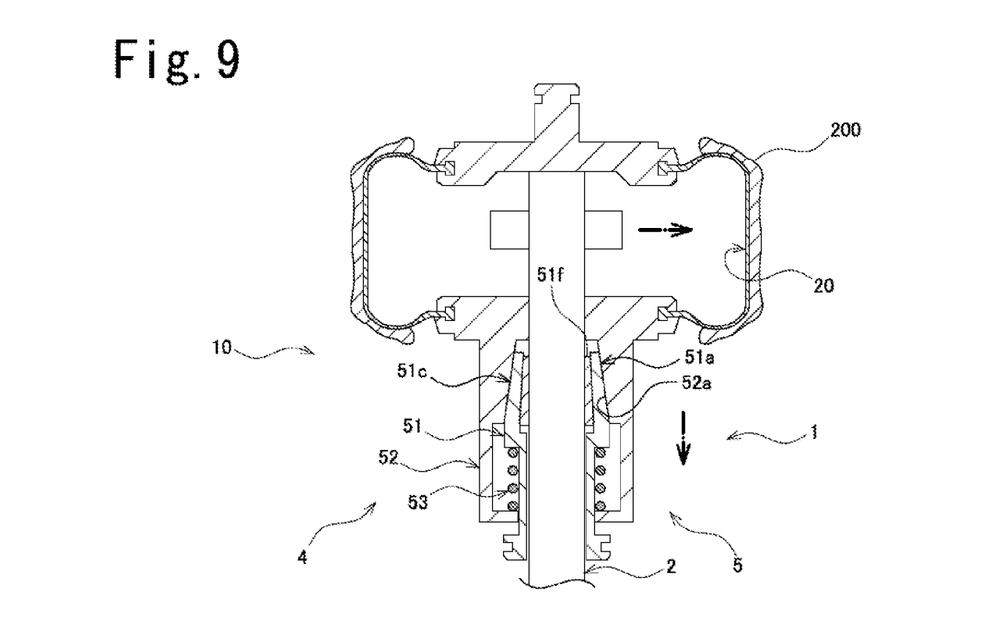
FIG. 9 is a sectional view of essential portions of the bladder-fixing unit according to the embodiment for explaining the switching operation of the states.

According to this, as shown in FIG. 9, if the bladder 20 expands, the outer cylindrical body 52 moves toward one side in the axial direction (lower side in FIG. 9) relative to the inner cylindrical body 51. Since the inner periphery of the outer cylindrical taper portion 52a comes into contact with the outer periphery of the inner cylindrical taper portion 51a, the elastic portion 51c elastically deforms. As a result, since the contact portion 51f approaches, pressurizes and comes into contact with the outer periphery of the shaft body 2, the connecting body 4 is fixed to the shaft body 2, and the state is switched to the fixed state.

When the connecting body 4 is in the fixed state, the biasing body 33 biases the outer cylindrical body 52 in such a direction that the outer cylindrical body 52 moves toward one side in the axial direction relative to the inner cylindrical body 51. Therefore, unless an exterior force is applied to the connecting body 4, the fixed state of the connecting body 4 is maintained.

When the connecting body 4 is in the fixed state, if an external force is applied to the connecting body 4 and the inner cylindrical body 51 moves toward the one side in the axial direction relative to the outer cylindrical body 52, the elastically deformed elastic portion 51c restores as shown in FIG. 8. According to this, the connecting body 4 is brought into the movable states. In this manner, the connecting body 4 is switched, by the switching mechanism 5, between the fixed state where the connecting body 4 pressurizes and comes into contact with the shaft body 2 so that the connecting body 4 is fixed to the shaft body 2, and the movable state where the pressurized and contacted state is released so that the connecting body 4 can move in the axial direction relative to the shaft body 2.

As described above, the bladder-fixing unit 1 according to the embodiment fixes a bladder 20 which expands in a tire 200 to hold the tire 200, the bladder-fixing unit 1 includes a shaft body 2 inserted into the bladder 20, and a connecting body 4 for fixing the bladder 20 and for connecting the bladder 20 and the shaft body 20 to each other, the connecting body 4 includes a switching mechanism 5 for switching between a state where the connecting body 4 pressurizes and comes into contact with an outer periphery of the shaft body 2 and is fixed to the shaft body 2, and a movable state where the connecting body 4 can move in an axial direction of the shaft body 2 relative to the shaft body 2 by releasing the state where the connecting body 4 pressurizes and comes into contact with the outer periphery of the shaft body 2.

According to this configuration, the connecting body 4 which fixes the bladder 20 connects, to each other, the bladder 20 and the shaft body 2 which is inserted into the bladder 20. The connecting body 4 is switched by the switching mechanism 5 between the state where the connecting body 4 pressurizes and comes into contact with the outer periphery of the shaft body 2 and is fixed to the shaft body 2, and the movable state where the pressurized and contacted state is released so that the connecting body 4 can move in the axial direction relative to the shaft body 2. According to this, since the connecting body 4 can be fixed to the shaft body 2 at the plurality of positions of the shaft body 2, the bladder-fixing unit 1 can handle tires 200 or a plurality of sizes.

In the bladder-fixing unit 1 according to the embodiment, the switching mechanism 5 includes a cylindrical inner cylindrical body 51 into which the shaft body 2 is inserted, and a cylindrical outer cylindrical body 52, if the outer cylindrical body 52 moves toward the one side in the axial direction relative to the inner cylindrical body 51, an inner periphery of the outer cylindrical body 52 comes into contact with an outer periphery of the inner cylindrical body 51, the inner cylindrical body 51 includes a contact portion 51f which pressurizes and comes into contact with the outer periphery of the shaft body 2, and an elastic portion 51c, and if the outer periphery of the inner cylindrical body 51 comes into contact with the inner periphery of the outer cylindrical body 52, the elastic portion 51c elastically deforms such that the contact portion 51f approaches, pressurizes and comes into contact with the outer periphery of the shaft body 2.

According to this configuration, the shaft body 2 is inserted into the cylindrical inner cylindrical body 51. If the cylindrical outer cylindrical body 52 moves toward the one side in the axial direction relative to the inner cylindrical body 51, the inner periphery of the outer cylindrical body 52 comes into contact with the outer periphery of the inner cylindrical body 51. The inner cylindrical body 51 includes the contact portion 51f which pressurizes and comes into contact with the outer periphery of the shaft body 2, and the elastic portion 51c which elastically deforms.

If the outer periphery of the inner cylindrical body 51 comes into contact with the inner periphery of the outer cylindrical body 52, the elastic portion 51c elastically deforms. Therefore, the contact portion 51f approaches the outer periphery of the shaft body 2 and pressurizes and comes into contact with the outer periphery of the shaft body 2. According to this, the connecting body 4 is switched from the state where the connecting body 4 can move in the axial direction relative to the shaft body 2 to the state where the connecting body 4 is fixed to the shaft body 2.

In the bladder-fixing unit 1 according to the embodiment, the outer cylindrical body 52 fixes the bladder 20, and a diameter of the outer periphery of the inner cylindrical body 51 and a diameter of the inner periphery of the outer cylindrical body 52 increase toward the one side in the axial direction such that as the bladder 20 expands, the outer cylindrical body 52 moves toward the one side in the axial direction relative to the inner cylindrical body 51, and the elastic portion 51c elastically deforms.

According to this configuration, the outer cylindrical body 52 fixes the bladder 20. Diameters of the outer periphery of the inner cylindrical body 51 and the inner periphery of the outer cylindrical body 52 increase toward the one side in the axial direction. According to this, as the bladder 20 expands, the outer cylindrical body 52 moves toward one side in the axial direction relative to the inner cylindrical body 51, and the inner periphery of the outer cylindrical body 52 comes into contact with the outer periphery of the inner cylindrical body 51.

As a result, since the elastic portion 51c elastically deforms, the contact portion 51f can pressurize and come into contact with the outer periphery of the shaft body 2. Therefore, by expanding the bladder 20, the connecting body 4 can be switched from the movable state to the fixed state.

In the bladder-fixing unit 1 according to the embodiment, the switching mechanism 5 includes a biasing body 53 which biases the outer cylindrical body 52 in a direction in which the outer cylindrical body 52 moves toward the one side in the axial direction relative to the inner cylindrical body 51 when the connecting body 4 is in the state where it is fixed to the shaft body 2.

According to this configuration, when the connecting body 4 is in the state where it is fixed to the shaft body 2, the biasing body 53 biases the outer cylindrical body 52 in the direction where the outer cylindrical body 52 moves toward one side in the axial direction relative to the inner cylindrical body 51. According to this, it is possible to maintain the state where the contact portion 51f pressurizes and comes into contact with the outer periphery of the shaft body 2 and the connecting body 4 is fixed to the shaft body 2.

The bladder-fixing unit is not limited to the configuration of the embodiment described above, and the effects are not limited to those described above. It goes without saying that the bladder-fixing unit can be variously modified without departing from the scope of the subject matter of the present invention. For example, the constituents, methods, and the like of various modified examples described below may be arbitrarily selected and employed as the constituents, methods, and the like of the embodiments described above, as a matter of course.

In the bladder-fixing unit 1 of the embodiment, for example, the switching mechanism 5 includes the inner cylindrical body 51 and the outer cylindrical body 52, and the inner cylindrical body 51 includes the elastic portion 51c. When the outer periphery of the inner cylindrical body 51 comes into contact with the inner periphery of the outer cylindrical body 52, the elastic portion 51c elastically deforms such that the contact portion 51f approaches, pressurizes and comes into contact with the outer periphery of the shaft body 2. However, the bladder-fixing unit is not limited to this configuration.

Figure 10:
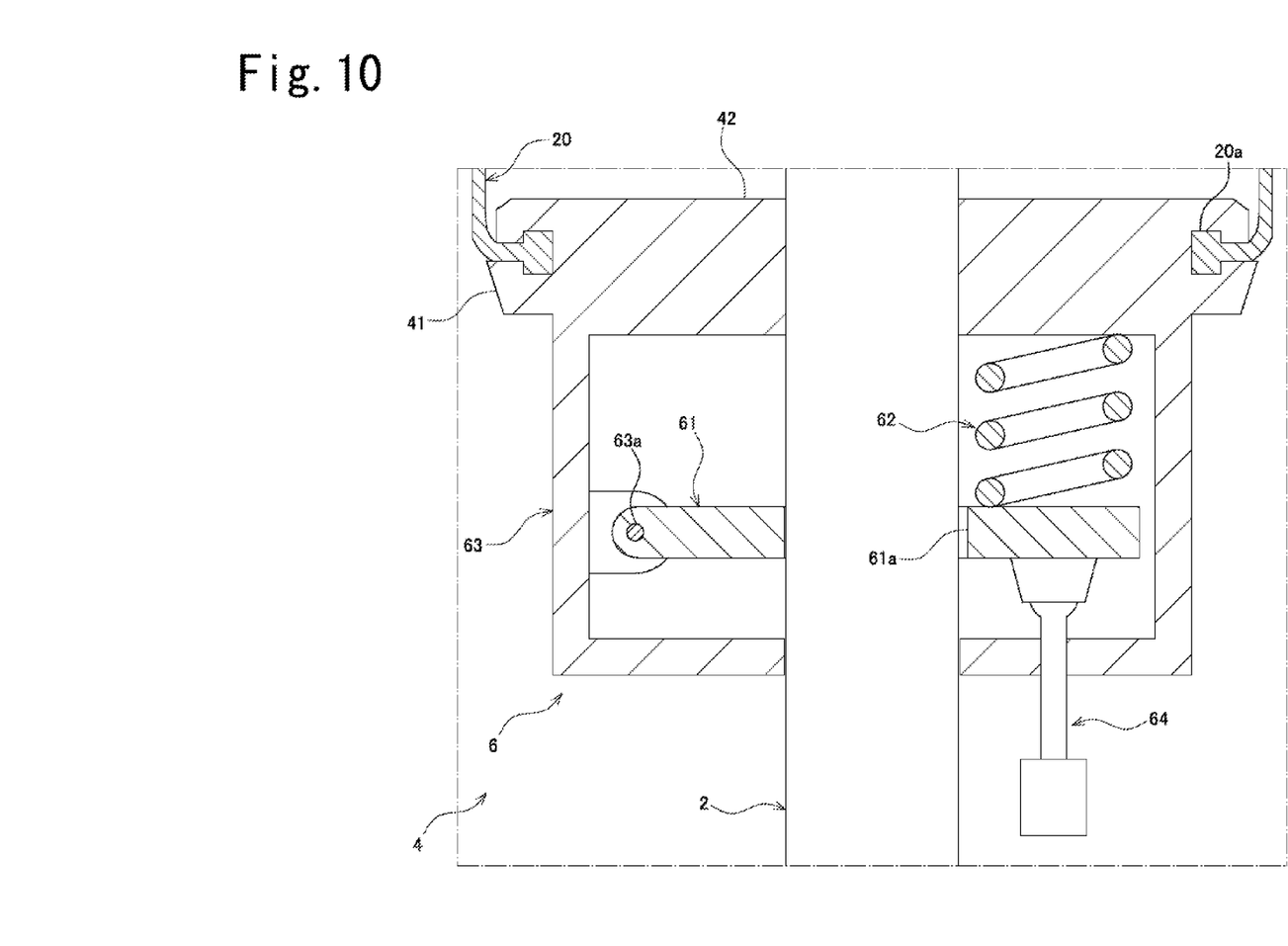
FIG. 10 is a sectional view of essential portions of a bladder-fixing unit according to another embodiment and shows its movable state.
Figure 11:
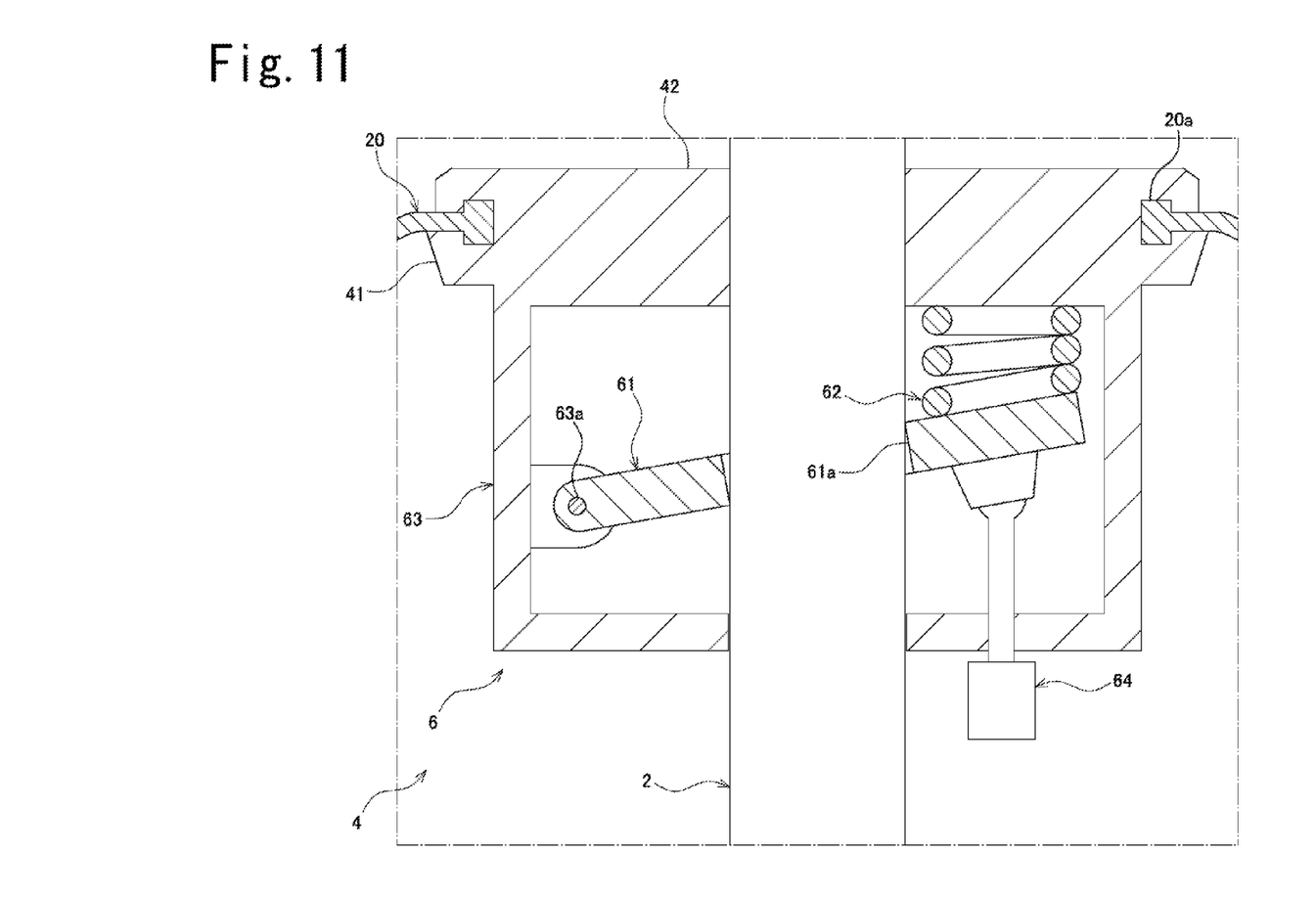
FIG. 11 is a sectional view of essential portions of the bladder-fixing unit according to the embodiment and shows its fixed state.

For example, as shown in FIGS. 10 and 11, the bladder-fixing unit may employ a configuration that the switching mechanism 6 includes a plate body 61 having an opening 61a into which the shaft body 2 is inserted, and if the plate body 61 turns by a rotation shaft 63a which is placed outside the shaft body 2, the opening 61a of the plate body 61 pressurizes and comes into contact with the outer periphery of the shaft body 2.

The switching mechanism 6 according to FIGS. 10 and 11 includes the plate body 61 having the opening 61a into which the shaft body 2 is inserted, and the biasing body 62 for biasing the plate body 61. The switching mechanism 6 also includes a body portion 63 in which the plate body 61 and the biasing body 62 are accommodated, and an operating portion 64 for operating the plate body 61.

The body portion 63 is connected to the bladder-fixing portion 41 and the closing portion 42 on the other side in the axial direction (upper side in FIGS. 10 and 11). A base end of the plate body 61 is rotatably connected to the body portion 63 by the rotation shaft 63a which is placed outside the shaft body 2. In this embodiment, the biasing body 62 is a coil spring.

As shown in FIG. 10, when the biasing body 62 restores, the plate body 61 intersects with the shaft body 2 at right angles. At this time, the connecting body 4 is in the movable state where it can move in the axial direction relative to the shaft body 2.

As shown in FIG. 11, the operating portion 64 pushes a tip end of the plate body 61 toward the other side in the axial direction against a biasing force of the biasing body 62. Hence, the plate body 61 turns around the rotation shaft 63a which is placed outside the shaft body 2. According to this, since the opening 61a of the plate body 61 pressurizes and comes into contact with the outer periphery of the shaft body 2, the connecting body 4 is brought into the fixed state where it is fixed to the shaft body 2.

In this manner, the connecting body 4 is switched, by the switching mechanism 6, between the state where it is fixed to the shaft body 2 (FIG. 11) if the connecting body 4 pressurizes and comes into contact with the outer periphery of the shaft body 2, and a state where the connecting body 4 can move in the axial direction relative to the shaft body 2 (FIG. 10) by releasing the pressurized and contacted state. The operating portion 64 can be held relative to the body portion 63 at a first position shown in FIG. 10 and at a second position shown in FIG. 11.

In the bladder-fixing unit 1 according to the embodiment, a shape of the cross section of the shaft body 2 is circular. However, the bladder-fixing unit is not limited to this configuration. For example, in the bladder-fixing unit, the cross sectional shape of the shaft body 2 may be a polygonal shape, or may be an elliptic shape.

In the bladder-fixing unit 1 of the embodiment, the outer cylindrical body 52 is fixed to the bladder 20. However, the bladder-fixing unit is not limited to this configuration. In the bladder-fixing unit, for example, the inner cylindrical body 51 may be fixed to the bladder 20.

In the bladder-fixing unit 1 of the embodiment, the diameter of the outer periphery of the inner cylindrical body 51 increases toward the one side in the axial direction, and the diameter of the inner periphery of the outer cylindrical body 52 increases toward the one side in the axial direction. However, the bladder-fixing unit is not limited to this configuration. In the bladder-fixing unit, for example, only the diameter of one of the outer periphery of the inner cylindrical body 51 and the inner periphery of the outer cylindrical body 52 may increase toward the one side in the axial direction.

In the bladder-fixing unit 1 of the embodiment, the biasing body 53 is the coil spring. However, the bladder-fixing unit is not limited to this configuration. In the bladder-fixing unit, for example, the biasing body 53 may bias the inner cylindrical body 51 and the outer cylindrical body 52 using pressurized gas.

Figure 12:
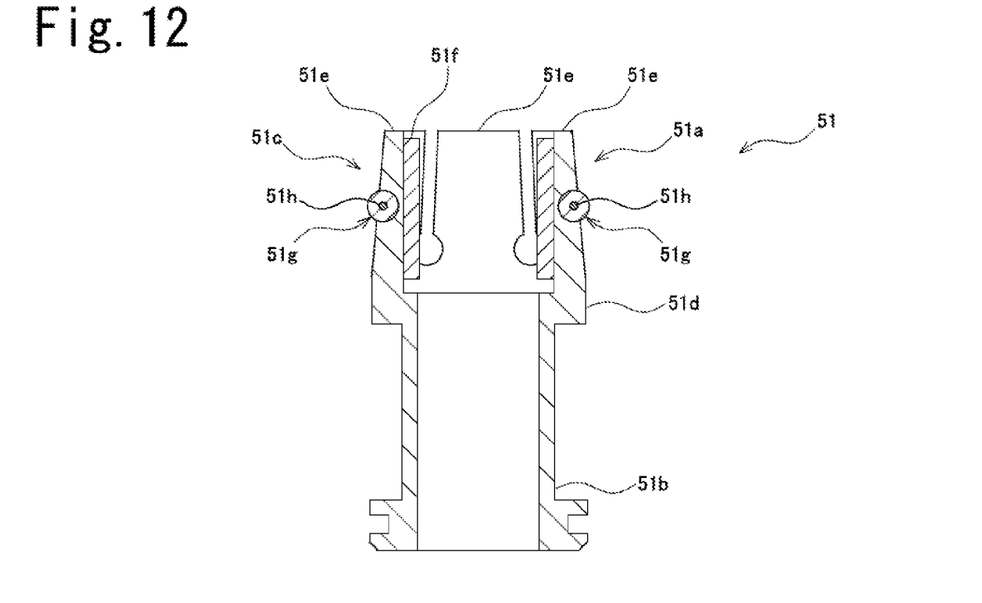
FIG. 12 is a sectional view of an entire inner cylindrical body according to another embodiment.

In the fixing unit 1, as shown in FIG. 12, the inner cylindrical body 51 may be provided at its outer periphery with a disk-shaped or spherical rotation body 51g. The rotation body 51g can rotate around a rotation shaft 51h, and the rotation body 51g rotates when the inner periphery of the outer cylindrical body 52 slides on the outer periphery of the inner cylindrical body 51. According to this configuration, the outer cylindrical body 52 can smoothly move toward the one side in the axial direction relative to the inner cylindrical body 51.

Figure 13:
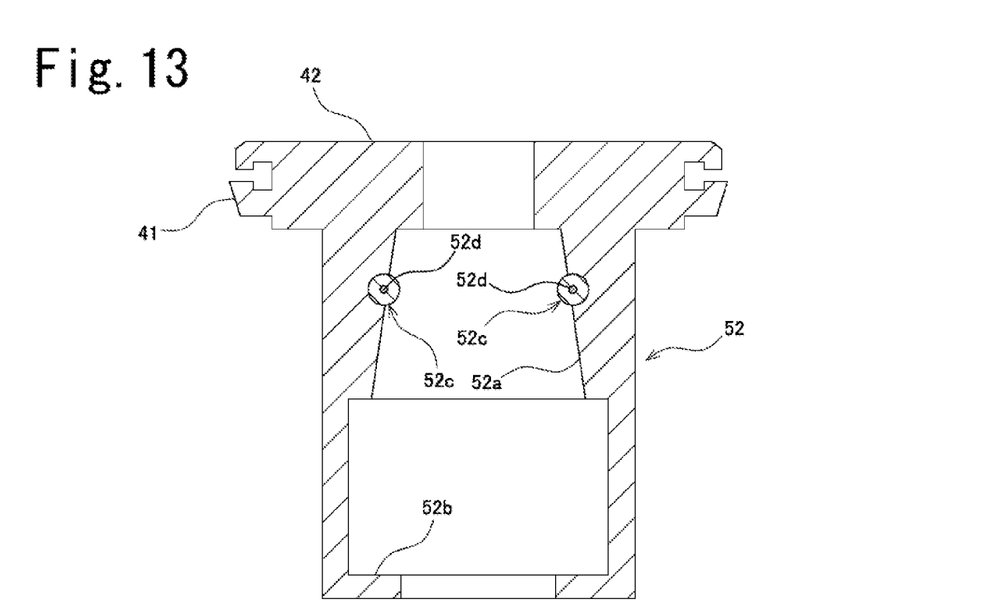
FIG. 13 is a sectional view of an entire assembly having an outer cylindrical body according to another embodiment.

As show in FIG. 13, in the fixing unit 1, the outer cylindrical body 52 may be provided at its inner periphery with a disk-shaped or spherical rotation body 52c. The rotation body 52c can rotate around a rotation shaft 52d, and the rotation body 52c rotates when the inner periphery of the outer cylindrical body 52 slides on the outer periphery of the inner cylindrical body 51. According to this configuration, the outer cylindrical body 52 can smoothly move toward the one side in the axial direction relative to the inner cylindrical body 51.

What is claimed is:

1. A bladder-fixing unit for fixing a bladder which expands in a tire to hold the tire, wherein
the bladder-fixing unit includes a shaft body inserted into the bladder, and a connecting body for fixing the bladder and for connecting the bladder and the shaft body to each other,
the connecting body includes a switching mechanism for switching between a state where the connecting body pressurizes and comes into contact with an outer periphery of the shaft body and is fixed to the shaft body, and a movable state where the connecting body can move in an axial direction of the shaft body relative to the shaft body by releasing the state where the connecting body pressurizes and comes into contact with the outer periphery of the shaft body.

2. The bladder-fixing unit according to claim 1, wherein the switching mechanism includes a cylindrical inner cylindrical body into which the shaft body is inserted, and a cylindrical outer cylindrical body,
if the outer cylindrical body moves toward the one side in the axial direction relative to the inner cylindrical body, an inner periphery of the outer cylindrical body comes into contact with an outer periphery of the inner cylindrical body,
the inner cylindrical body includes a contact portion which pressurizes and comes into contact with the outer periphery of the shaft body, and an elastic portion, and
if the outer periphery of the inner cylindrical body comes into contact with the inner periphery of the outer cylindrical body, the elastic portion elastically deforms such that the contact portion approaches, pressurizes and comes into contact with the outer periphery of the shaft body.

3. The bladder-fixing unit according to claim 2, wherein the outer cylindrical body fixes the bladder, and
a diameter of the outer periphery of the inner cylindrical body and a diameter of the inner periphery of the outer cylindrical body increase toward the one side in the axial direction such that as the bladder expands, the outer cylindrical body moves toward the one side in the axial direction relative to the inner cylindrical body, and the elastic portion elastically deforms.

4. The bladder-fixing unit according to claim 2, wherein the switching mechanism includes a biasing body which biases the outer cylindrical body in a direction in which the outer cylindrical body moves toward the one side in the axial direction relative to the inner cylindrical body when the connecting body is in the state where it is fixed to the shaft body.

5. The bladder-fixing unit according to claim 4, wherein even when the connecting body is in the movable state where the connecting body can move in the axial direction relative to the shaft body, the biasing body biases the outer cylindrical body in the direction where the outer cylindrical body moves toward the one side in the axial direction relative to the inner cylindrical body.

6. The bladder-fixing unit according to claim 2, wherein only the contact portion of the inner cylindrical body is made of material which is different from those of other portions, and
the contact portion is made of material having a larger friction coefficient with respect to the shaft body than those of the other portions.

* * * * *